United States Patent Office 3,474,080
Patented Oct. 21, 1969

3,474,080
CATALYTIC PROCESS FOR OLEFIN
POLYMERIZATION
Louis J. Rekers, Cincinnati, Ohio, assignor to National
Distillers and Chemical Corporation, New York, N.Y.,
a corporation of Virginia
No Drawing. Filed June 27, 1966, Ser. No. 560,802
Int. Cl. C08f 3/12, 15/04; B01j 11/82
U.S. Cl. 260—88.2
15 Claims

ABSTRACT OF THE DISCLOSURE

Chromyl bis (diorganophosphates) and their use as catalysts in the polymerization of alpha-monoolefins.

---

This invention relates to the catalytic polymerization of olefin hydrocarbons and more particularly to a process and catalyst therein for the polymerization of ethylenically unsaturated hydrocarbons. Still more particularly, the invention relates to a polymerization process utilizing a catalyst system comprising a reducing agent and a novel organophosphate chromate structure.

In the process embodied herein, the catalyst system comprises (1) a suitable reducing agent and (2) a compound of the formula

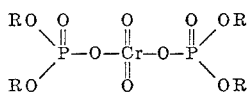

wherein R is a hydrocarbon radical, e.g., alkyl, aralkyl, aryl, cycloalkyl, or the like, or combinations thereof. As specific examples of compounds falling within the scope of the aforesaid formula and useful for the practice of this invention are the following: chromyl bis(di-tolylphosphate) (prepared from tricresyl phosphate), chromyl bis(diphenylphosphate) (prepared from triphenyl phosphate), chromyl bis(dicyclohexylphosphate) (prepared from tricyclohexyl phosphate), chromyl bis(dibutylphosphate) (prepared from tributyl chromate), and so forth. Especially preferred for this invention are the aralkyl compounds such as the tricresyl derivatives.

The novel catalyst component of the catalyst system of this invention is prepared by reacting a substituted triorganophosphate of the formula $(R)_3PO_4$, wherein R is defined as above, with chromium oxide at an elevated temperature in a hydrocarbon solvent. Examples of the phosphate include tributyl phosphate, tricyclohexyl phosphate, triphenyl phosphate, tricresyl phosphate, and the like.

The reactants are heated in any suitable hydrocarbon solvent that is resistant to oxidative attack by the chromium trioxide. Examples of solvents include methylene chloride, carbon tetrochloride, chloroform, hexane, octane, cyclohexane, and decahydronaphthalene, and mixtures of these. In general the solvent is a saturated hydrocarbon of the halogenated, alkyl, or cycloalkyl variety having a reflux temperature between about 15° and 80° C. at 1 atmosphere.

Although the chromium trioxide and the triorganophosphate are reacted preferably in a molar ratio of 1:1, it is possible to use a ratio of chromium trioxide to the phosphate of about 1:5 up to about 5:1. Any proportion lower than about 1:5 gives a very small amount of usable product while anything above about 5:1 is wasteful of the chromium trioxide. The solvent is employed in the reaction in an amount sufficient to give a total concentration of about 0.1 to 5.0 molar with respect to the reactants in the reaction vessel. For example, 0.2 mole of tricresyl phosphate (74 grams) and 0.2 mole (20 grams) of chromium trioxide are reacted together in 1000 ml. of solvent to give a total molar concentration of 0.4. The preferred total molar concentration in the initial preparation is about 0.4 to 0.5.

The reaction time can vary from a few minutes up to twenty four hours or longer, but the usual reaction time for a high yield is approximately eight hours. The catalyst yield increases with time of reaction and is limited by the amount of reactants used.

The reaction temperature varies depending upon the solvent selected; however, a reflux temperature between about 15° and 80° C. is preferred. For example, when the solvent is methylene chloride, the reaction temperature is about 41° C. at 1 atmosphere pressure.

In reference to the reducing agent that is the other component of the catalyst system embodied herein, particularly suitable and preferred are the trialkyl aluminums, such as triethylaluminum, tripropyl aluminum, triisobutyl aluminum, tri-n-decyl aluminum, and the like. Also diethyl zinc or other organometallic reductants may be employed, such as diethyl magnesium, diethyl cadmium, and so forth.

Reaction conditions at which the polymerization may be carried out with the novel catalyst system include the following:

Temperature.—About 50° to 200° C., preferably about 90° to 125° C.

Pressure.—About 50 to 5000 p.s.i., preferably about 200 to 700 p.s.i.

Ratio of catalyst components (mole ratio of reducing agent to organophosphate chromate).—About 0.1 to 5:1, preferably 2.5:1.

Total catalyst concentration.—Not critical, but preferably about 0.1 to 5 grams of catalyst product per liter of solvent in the reaction vessel; about 0.01 to 1.0 percent, based on the weight of the monoolefin.

Although the invention, in broad aspects, can be carried out under the aforesaid conditions, particularly suitable results are obtained by use of an aluminum-containing reducing agent, preferably a trialkylaluminum, in combination with the aforesaid compound

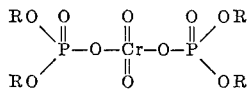

The compounds which may be polymerized according to the present invention consist generally of hydrocarbons, such as the olefins containing from 2 to 6 carbon atoms, that are polymerizable when contacted with the aforedefined combination catalyst under polymerizing conditions of temperature and pressure. Specific examples of such polymerizable hydrocarbons include ethylene, proylene, butene-1, pentene-1, hexene-1, 4-methylpentene-1, and the like. Mixtures of such hydrocarbons, as for example a mixture of ethylene and butene-1, may also be used for copolymerization with the catalyst system embodied herein.

The polymerization reaction is carried out in either batch, semi-continuous, or continuous operations. Most conveniently, and in the present embodiments, the process at lower pressure operations is carried out in a diluent or liquid reaction medium, the amount not being unduly critical, but it should be at least sufficient to permit effective agitation.

Any suitable anhydrous oxygen-free organic medium may be used as the solvent for polymerization. Examples include aliphatic alkanes or cycloalkanes such as pentane, hexane, heptane, cyclohexane; hydrogenated aromatics such as decahydronaphthalene; high molecular weight paraffins which are liquid at the reaction temperature; aromatics such as benzene, toluene, xylene; and so forth; and mixtures thereof. Other suitable reaction media include ethylbenzene, isopropyl benzene, ethyl toluene, n-propyl benzene, diethylbenzenes, mono- and dialkyl naphthalenes, n-octane, isooctane, methyl cyclohexane, tetralin, Decalin, and other inert liquid hydrocarbons.

In carrying out the polymerization reaction at relatively high pressures, such reaction media may be absent or substantially absent, and in such instances the need for solvent recovery systems and the like may be obviated.

It is preferred that the selected reaction medium be essentially free of impurities which may react to destroy catalyst activity or which copolymerize with the olefinic hydrocarbon; that is, appreciable quantities of materials such as carbon dioxide, oxygen, and acetylenic compounds should preferably be absent.

For this process the polymerizable hydrocarbon may be used in substantially pure form, or there may be used a mixture containing major quantities thereof, provided no impurities are present in substantial amount to destroy the catalyst and/or contaminate the polymer products. For instance, ethylene obtained by the cracking of hydrocarbon streams is satisfactory if acetylenic and oxygenated materials are not present in more than trace amounts.

In carrying out the polymerization process described herein, it is highly desirable to maintain the polymerization zone free of extraneous gases. This can be done by keeping the reactor blanketed at all times with an inert gas, e.g., operating with an inert gas such as nitrogen, argon, or helium. Preferably the reactor and its contents are blanketed with the polymerization substance, e.g., ethylene gas, to avoid unnecessary dilution of the reactor contents with inert gases.

To describe the invention further, the following examples set forth specific embodiments of catalyst systems embodied herein for polymerizing olefins to high molecular weight polymers.

EXAMPLE I

Chromium trioxide (3.26 grams) and tricresylphosphate (12 ml.) were heated in a 250 ml., 3-necked Morton flask at 41° C. for 60 minutes, using 100 ml. of methylene chloride as the reaction medium. As the reaction proceeded, the solven turned brown. The unreacted chromium trioxide was then filtered off and the brown liquid evaporated to a solid. The yield was 50 percent based on the weight of reactants charged. The product was chromyl bis(ditolylphosphate).

EXAMPLE II

The procedure of Example I was repeated except that the phosphate was triphenyl phosphate. The product was chromyl bis(diphenylphosphate) in a 40 percent yield.

EXAMPLE III

Into a 1-gallon nitrogen-purged stirred autoclave reactor were introduced 1000 grams of pentane, 0.36 gram of chromyl bis(ditolylphosphate), and 0.31 gram of triethylaluminum. The autoclave was sealed, stirring commenced, the contents heated to 100° C., and ethylene pressure of 360 p.s.i. applied to the solution in the autoclave. Ethylene consumption began almost immediately. The reaction was stopped after 80 minutes by relieving the ethylene pressure. There was recovered 93 grams of tough polyethylene having a high load melt index of 3.7 and a density of 0.96.

EXAMPLE IV

The procedure of Example III was repeated except that 0.25 gram of chromyl bis(diphenylphosphate) and 0.20 gram of triethylaluminum were used as the catalyst system; the polymerization proceeded at 102° C. and a ethylene pressure of 360 p.s.i. The reaction was stopped after 30 minutes. There was recovered 40 grams of tough polyethylene having a high load melt index of 4.5 and a density of 0.960.

EXAMPLE V

The procedure of Example III was repeated except that 15 grams of butene-1 was added to the reaction mixture. The reaction was conducted at 101° C. There was obtained 63 grams of an ethylene/butene copolymer containing 0.4 percent by weight of the butene comonomer and having a melt index of 0.3 and a density of 0.950.

EXAMPLE VI

The procedure of Example V was repeated except that 0.3 gram of chromyl bis(diphenylphosphate) and 0.26 gram of triethylaluminum were used as the catalyst system. 15 grams of butene-1 was introduced to the reaction mixture, and the polymerization conducted at 102° C. There was recovered 51 grams of an ethylene/butene copolymer containing 0.3 percent by weight of the butene comonomer and having a melt index of 0.2 and a density of 0.952.

While there are above disclosed but a limited number of embodiments of the process of the invention herein presented, it is possible to produce still other embodiments without departing from the inventive concept herein disclosed, and it is desired therefore that only such limitations be imposed on the appended claims as are stated therein.

What is claimed is:
1. A compound of the formula

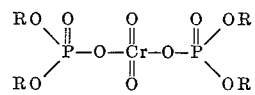

wherein R is a hydrocarbon radical selected from the group consisting of alkyl, aralkyl, aryl, and cycloalkyl radicals.

2. The compound of claim 1 wherein R is tolyl.
3. The compound of claim 1 wherein R is phenyl.
4. A polymerization process which comprises contacting an alpha-monoolefin with a combination catalyst comprising (1) an organometallic compound as reducing agent selected from the group consisting of trialkylaluminums, diethyl zinc, diethyl magnesium and diethyl cadmium and (2) a compound of the formula

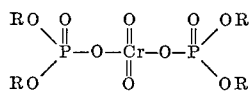

wherein R is a hydrocarbon radical selected from the group consisting of alkyl, aralkyl, aryl, and cycloalkyl radicals.

5. The process of claim 4 wherein R is tolyl.
6. The process of claim 4 wherein R is phenyl.
7. A polymerization process which comprises contacting an alpha-monoolefin at a temperature of about 50° to 200° C. and a pressure of about 50 to 5000 p.s.i. with about 0.1 to about 1.0 percent, based on the weight of the monoolefinic hydrocarbon, of a combination catalyst comprising (1) a trialkylaluminum as reducing agent and (2) a compound of the formula

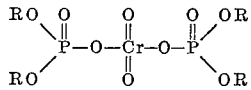

wherein R is a hydrocarbon radical selected from the group consisting of alkyl, aralkyl, aryl, and cycloalkyl radicals in which the mole ratio of the reducing agent to said compound is about 0.1 to 5.1 to produce a normally solid polymer of said alpha-monoolefin.

8. The process of claim 7 wherein the reducing agent is triethylaluminum, the compound is chromyl bis(ditolylphosphate), and the alpha-monoolefin is ethylene.
9. The process of claim 7 wherein the reducing agent is triethylaluminum, the compound is chromyl dis-diphenylphosphate), and the alpha-monoolefin is ethylene.

10. The process of claim 7 wherein the reducing agent is triethylaluminum, the compound is chromyl bis(ditolylphosphate) and the alpha-monoolefin is a mixture of ethylene and a comonomer copolymerizable therewith.

11. The process of claim 10 wherein the comonomer is butene.

12. The process of claim 7 wherein the reducing agent is triethylaluminum, the compound is chromyl bis(diphenylphosphate), and the alpha-monoolefin is a mixture of ethylene and a comonomer copolymerizable therewith.

13. The process of claim 2 wherein the comonomer is butene.

14. The process of claim 7 wherein the polymerization reaction is carried out in the presence of an inert liquid reaction medium.

15. The process of claim 7 wherein the reaction temperature is about 90° to 125° C., the reaction pressure is about 200 to 700 p.s.i., and the mole ratio of the reducing agent to the compound is about 2.5:1.

References Cited

UNITED STATES PATENTS

| | | | |
|---|---|---|---|
| 2,329,707 | 9/1943 | Farrington et al. | 260—438.5 |
| 3,219,676 | 11/1965 | Wilkinson | 260—438.5 |
| 3,310,575 | 3/1967 | Spivack | 260—438.5 |
| 3,324,101 | 6/1967 | Baker et al. | 260—94.9 |
| 3,324,095 | 6/1967 | Carrick et al. | 260—94.9 |

OTHER REFERENCES

Courtemanche et al., Bull. Soc. Chim. (France) 1964 (11) 2801—7.

JOSEPH L. SCHOFER, Primary Examiner

E. J. SMITH, Assistant Examiner

U.S. Cl. X.R.

252—431; 260—93.7, 94.9, 438.5